United States Patent [19]

Sullivan

[11] Patent Number: 5,106,525
[45] Date of Patent: Apr. 21, 1992

[54] PAINT STRIPPER COMPOSITIONS CONTAINING GAMMA-BUTYROLACTONE

[75] Inventor: Carl J. Sullivan, Exton, Pa.

[73] Assignee: Arco Chemical Technology, L.P., Wilmington, Del.

[21] Appl. No.: 684,406

[22] Filed: Apr. 12, 1991

[51] Int. Cl.$^5$ .................... C11D 7/22; C23D 17/00
[52] U.S. Cl. .................... 252/162; 252/153; 252/170; 252/171; 252/DIG. 8; 134/38; 134/39; 134/40
[58] Field of Search ............... 252/153, 162, 170, 171, 252/DIG. 8, 174.13, 174.23, 174.24; 134/38, 39, 40

[56] References Cited

U.S. PATENT DOCUMENTS

| | | | |
|---|---|---|---|
| 4,120,810 | 10/1978 | Palmer | 252/153 |
| 4,732,695 | 3/1988 | Francisco | 252/162 |
| 4,749,510 | 6/1988 | Nelson | 252/166 |
| 4,780,235 | 10/1988 | Jackson | 252/170 |
| 4,812,255 | 3/1989 | Suwala | 252/170 |
| 4,836,950 | 6/1989 | Madsen et al. | 252/DIG. 8 |
| 4,927,556 | 5/1990 | Pokorny | 252/173 |
| 4,968,447 | 11/1990 | Dixon; et al. | 252/174.23 |
| 5,006,279 | 4/1991 | Grobbel et al. | 252/542 |
| 5,011,621 | 4/1991 | Sullivan | 252/DIG. 8 |
| 5,015,410 | 5/1991 | Sullivan | 252/DIG. 8 |
| 5,035,829 | 7/1991 | Suwala | 252/170 |

FOREIGN PATENT DOCUMENTS

| | | |
|---|---|---|
| 0294041 | 12/1988 | European Pat. Off. . |
| 0389829 | 10/1990 | European Pat. Off. . |
| WO88/06640 | 4/1988 | PCT Int'l Appl. . |

*Primary Examiner*—A. Lionel Clingman
*Assistant Examiner*—William S. Parks
*Attorney, Agent, or Firm*—Jonathan L. Schuchardt

[57] ABSTRACT

Aggressive, water-soluble coating remover compositions are disclosed. The compositions contain γ-butyrolactone, an organic acid, and water, and optionally include solvents, surfactants, thickeners, and rust inhibitors. The coating removers of the invention are uniquely effective in that they are both water rinsable and capable of removing highly crosslinked coatings.

20 Claims, No Drawings

PAINT STRIPPER COMPOSITIONS CONTAINING GAMMA-BUTYROLACTONE

FIELD OF THE INVENTION

The invention relates to coating remover compositions. Specifically, aggressive, water-soluble, low-volatility coating remover compositions effective for removing highly crosslinked coatings such as two-part epoxies and two-part polyurethanes are disclosed. The compositions contain γ-butyrolactone, an organic acid, and water.

BACKGROUND OF THE INVENTION

Traditionally, methylene chloride has been used in paint strippers because of its high efficacy and low cost. Because methylene chloride is toxic, it is being replaced by less toxic, non-halogenated solvents such as N-methyl-2-pyrrolidone, dibasic esters, and other solvents.

The use of N-methyl-2-pyrrolidone (NMP) and dibasic esters in paint strippers, often in combination with aromatic solvents, is described, for example, in U.S. Pat. Nos. 4,120,810, 4,732,695, 4,749,510, and 4,780,235. These compositions are effective on a broad range of coatings, including some crosslinked coatings. Unfortunately, the aromatic solvents and dibasic esters are typically not water-miscible, so water rinsing is not feasible.

Water-rinsable compositions are taught in European Patent Application 0 294 041, in which diesters of $C_4-C_6$ dibasic acids are combined with water and a thickener. European Patent Application 0 389 829 teaches a water-reducible formulation that incorporates NMP, diesters of $C_4-C_6$ dibasic acids, glycol ethers, and a thickener. European Patent Application 0 355 763 teaches a water-reducible formulation that includes NMP, aromatic solvents, a glycol ether, an alkanolamine, and a thickener. The formulations described in all of these European applications are water rinsable. However, none of these is effective for stripping highly crosslinked coatings.

Activators, such as organic acids or organic bases, are sometimes used in paint strippers to enhance stripping ability. For example, U.S. Pat. No. 4,749,510 teaches to use formic acid to improve the performance of an NMP/aromatic solvent blend. International Application WO 88/06640 teaches that combinations of NMP or γ-butyrolactone (GBL) with an organic acid and a glycol ether are effective for stripping uncured paints. Performance results of GBL-containing compositions are not provided.

Thus, in spite of the availability of water-rinsable coating removers, the need remains for water-rinsable compositions that are effective for stripping highly crosslinked coatings.

It is an object of this invention to provide aggressive coating removers that are free of methylene chloride, water rinsable, and capable of stripping highly crosslinked coatings such as two-part epoxies and polyurethanes. It is another object of the invention to provide coating removers with high flash points to minimize fire hazards. It is another object of the invention to provide low-toxicity, low-cost compositions having a low content of volatile organic compounds (VOC) to minimize potential pollution of the environment.

SUMMARY OF THE INVENTION

The invention provides a water-soluble, low-volatility, low-toxicity, aggressive coating remover that is capable of stripping highly crosslinked coatings. The compositions contain γ-butyrolactone, an organic acid, and water. The organic acid preferably has the formula RCOOH in which R is selected from the group consisting of hydrogen $C_1-C_{10}$ alkyl, halogen-substituted $C_1-C_{10}$ alkyl, hydroxy-substituted $C_4-C_6$ alkyl, and $C_4-C_6$ cycloalkyl. An alkali metal salt of the organic acid may be used instead of or in addition to the organic acid. The compositions optionally include one or more additives selected from organic solvents, thickeners, surfactants, and rust inhibitors.

DETAILED DESCRIPTION OF THE INVENTION

γ-Butyrolactone (GBL) is required for the compositions of the invention. Any suitable amount of GBL may be used. It is preferred, however, that an amount within the range of about 40 to about 94 weight percent be used. Particularly preferred is an amount within the range of about 50 to about 80 weight percent. Any commercially available grade of GBL is satisfactory.

Preferred organic acids for the compositions of the invention have the general formula RCOOH in which R is selected from the group consisting of hydrogen $C_1-C_{10}$ alkyl, halogen-substituted $C_1-C_{10}$ alkyl, hydroxy-substituted $C_4-C_6$ alkyl, and $C_4-C_6$ cycloalkyl. Examples of suitable acids include, but are not limited to, formic, acetic, propionic, butyric, chloroacetic, glycolic, citric, and the like, and mixtures thereof. Formic acid and acetic acid are the most preferred acids.

It is also possible to use an alkali metal salt of the organic acid instead of or in addition to the organic acid. Thus, sodium acetate, potassium formate, sodium citrate, or the like may be used.

Any amount of organic acid may be used in the compositions of the invention. Because the acid component is typically rather corrosive, it is generally preferred to limit the amount of acid used. Preferably, the amount of organic acid used is within the range of about 1 to about 40 weight percent. More preferred is an amount within the range of about 5 to about 20 weight percent. Generally, amounts of organic acid greater than about 40 weight percent are unsuitable because of excessive corrosion problems.

Although stripping compositions containing only GBL and an organic acid are often satisfactory for removing highly crosslinked coatings, I have surprisingly found that the compositions are even more effective if water is included. Preferably, at least about 5 weight percent of water is present in the stripping composition. More preferred is an amount of water within the range of about 5 to about 55 weight percent. Particularly preferred is the range from about 10 to about 40 weight percent.

The compositions of the invention optionally include an organic solvent. Preferably, the organic solvent is selected from the group consisting of $C_1-C_{30}$ aliphatic and aromatic alcohols, glycols, glycol ethers, carbonates, amides, ketones, and esters. Preferably, the organic solvent is miscible with or at least partially soluble in water. Examples of suitable solvents include, but are not limited to, methanol, ethanol, isopropanol, n-butanol, propylene glycol, ethylene glycol, propylene glycol monomethyl ether, propylene glycol t-butyl ether, dipropylene glycol monomethyl ether, propylene carbonate, ethylene carbonate, N-methyl-2-pyrrolidone, methyl formate, ethyl acetate, dioctyl phthalate, acetone, and the like, and mixtures thereof. Particularly preferred due to high flash points and water miscibility are glycol ethers. The amount of organic solvent used is preferably within the range of about 5 to about 50 weight percent. More preferred is the range from about 10 to about 40 weight percent.

One or more surfactants are optionally included in the compositions of the invention. Preferably, the surfactant is used in an amount within the range of about 0.1 to about 10 weight percent. More preferred is the range from about 0.5 to about 5 weight percent. The surfactant improves wetting of the coated surface, and helps to accelerate penetration of the essential stripping components into the partially or fully cured coating. The surfactant also helps to emulsify non-water soluble components (such as stripped paint) during rinsing with water.

Any cationic, anionic, or nonionic surfactant known to those skilled in the art may be employed. Examples of suitable surfactants include, but are not limited to, polyethylene oxide condensates of alkyl phenols, partially esterified fatty acids, alkoylated fatty alcohols, hydrogenated castor oils, alkyl benzene sulfonates, and the like, and mixtures thereof.

Thickeners are optional additives in the compositions of the invention. Any of the conventional thickening agents well known to those skilled in the art may be used. It is preferred to use an amount of thickener within the range of about 0 to about 15 weight percent. Suitable thickeners include, but are not limited to, polyvinyl alcohol, hydroxypropyl cellulose, methyl cellulose, and the like, and mixtures thereof.

Rust inhibitors are optional additives in the compositions of the invention. Preferably, the amount of rust inhibitor used is within the range of about 0.1 to about 10 weight percent.

The coating compositions of the invention may be used to remove coatings by any of a wide variety of techniques that are well known to those skilled in the art. The compositions may be painted on, sprayed on, or used in a soak tank, for example. It will be understood by those skilled in the art that various types of rheological control of the formulation will be required depending on the particular application. For example, spray application techniques commonly used to apply coating removers in automotive or aerospace applications may require the use of thickeners to allow the coating remover to adhere sufficiently to vertical surfaces. In contrast, a soak-tank application might require no thickener.

Coatings that can be removed using the coating remover compositions of the invention include conventional paints, such as alkyds, acrylics, polyesters, vinyls, polyurethanes, latex paints, and epoxy coatings. The compositions of the invention are particularly advantageous for removing highly crosslinked coatings such as two-part epoxies and two-part polyurethane coatings. Water-miscible coating removers capable of stripping such coatings have not been previously disclosed.

The compositions of the invention may be used at any desired convenient temperature. Because they have low volatility, they may be used at ambient or elevated temperatures without significant evaporation losses.

The following examples merely illustrate the invention. Those skilled in the art will recognize many variations that are within the spirit of the invention and scope of the claims.

Coated Panels

Aluminum panels coated with either a two-part epoxy or a two-part polyurethane coating were obtained from DL laboratories. Coating thicknesses were about 1-2 mils. The epoxy coating was formulated from "Araldite 471-X-75" epoxy resin (product of Ciba-Geigy) and a conventional polyamide hardener. The polyurethane coating was formulated from "Desmophen 651A-65 PMA" polyester polyol and "Desmodur N-75" polyisocyanate (products of Mobay).

COMPARATIVE EXAMPLES 1-9

Effect of Various Paint Stripper Compositions Two-part Epoxy and Polyurethane Coatings (not this invention)

Various coating remover compositions were tested by applying several drops to the coated test panels, and covering with a watch glass. The time to lift the coating from the aluminum panel was recorded in Table 1.

With "Safest Stripper" (a product of 3M Company) (a combination of a dibasic ester, water, and thickener), a lift time of greater than 20 hours was observed with the epoxy coating; this coating remover did not damage the polyurethane coating within 24 hours (Comparative Example 1). A coating remover similar to that described in European Patent Application 0 389 829 was used in Comparative Example 2. The composition, which included NMP, dibasic esters, water, and propylene glycol monomethyl ether, required more than 5 hours to lift either the epoxy or the polyurethane coating.

Combinations of N-methyl-2-pyrrolidone with formic acid and tripropylene glycol monomethyl ether (Comparative Examples 3 and 4) were surprisingly ineffective, especially for stripping the polyurethane coating.

γ-Butyrolactone/formic acid/glycol ether combinations (Comparative Examples 5-8) were typically acceptable for the epoxy coating, but were ineffective for the polyurethane coating, especially at 10% formic acid content.

With γ-butyrolactone and formic acid alone (i.e., no water added), the lift time for the polyurethane coating was unsatisfactory (>300 min) (Comparative Example 9).

EXAMPLES 10-15

Effect of GBL/Water/Formic acid Paint Strippers Two-part Epoxy and Polyurethane Coatings The general procedure described in Comparative Examples 1-9 was repeated using the coating remover compositions of the invention.

As shown in Table 2, combinations of γ-butyrolactone, water, and formic acid are highly effective for stripping either of the highly crosslinked coating systems. Lift times of 29-86 minutes were observed with all of the formulations tested for the epoxy coating. All of the formulations successfully removed the tough polyurethane coating within 3 hours.

By comparing Example 13 (GBL/water/formic acid, 45:45:10) with Comparative Examples 7 and 8 (Table 1), we see the surprising advantage of using water instead of a glycol ether (PM or DPM) for removing the stubborn polyurethane coating.

Comparison of Example 14 (GBL/water/formic acid, 35:40:25) with Comparative Examples 3 and 5 clearly reveals the advantage of the GBL/water/formic acid system over a comparable GBL/glycol ether system (Comparative Example 5) or an NMP/glycol ether system (Comparative Example 3). The GBL/water system required 42 minutes to lift the polyurethane coating, while the GBL/glycol ether system required 119 minutes.

The advantage of the GBL/water/formic acid system is also evident from a comparison of Example 15 (GBL/water/formic acid, 46:32:22) with Comparative Examples 4 and 6. Removal of the polyurethane coating required 44 minutes with the GBL/water system, but 205 minutes with the analogous GBL/glycol ether combination.

Surprisingly, the GBL/water/formic acid combination outperforms the GBL/formic acid system with no water added. An 80:10:10 mixture of GBL/water/formic acid (Example 10) lifted the polyurethane coating in 70 minutes, while the 90:10 GBL/formic acid blend (Comparative Example 9) required greater than 300 minutes to lift the coating.

EXAMPLES 16-21

Effect of GBL/Water/Organic acid Paint Strippers Two-part Epoxy and Polyurethane Coatings The general procedure described in Examples 1-15 was repeated using various coating remover compositions of the invention. The results of this study appear in Table 3.

As shown in Table 3, the organic acids can be used alone, in combination with other acids, or in combination with alkali metal salts of organic acids. The salts are useful for controlling the corrosivity of the stripping formulations. Satisfactory strip times are obtained for either the epoxy, the polyurethane, or both coating types, depending on the formulation.

EXAMPLES 22-25

Effect of GBL/Water/Formic acid Strippers Two-part Epoxy and Polyurethane Coatings The general procedure of Examples 1-21 was followed. Coating remover compositions of the invention containing additional solvents and/or surfactants were tested on the same epoxy and polyurethane coatings. The results appear in Table 4.

As shown in Table 4, the coating removers of the invention, which all contain GBL, water, and formic acid, also perform well in the presence of surfactants and solvents such as alcohols, glycol ethers, esters, and amides.

TABLE 1

Effect of Coating Remover Compositions on Lift Time Two-Part Epoxy and Two-Part Polyurethane Coating Comparative Examples—Not this invention

| Ex | Coating Remover Composition (wt %) | Lift Time (min) Epoxy | Poly-urethane |
|---|---|---|---|
| C1 | "Safest Stripper" (3M Company) | >1200 | NL* |
| C2 | NMP/dibasic esters/PM/water (35/25/15/25) | >300 | >300 |
| C3 | NMP/TPM/formic acid (35/40/25) | 195 | >300 |
| C4 | NMP/TPM/formic acid (46/32/22) | 146 | >300 |
| C5 | GBL/TPM/formic acid (35/40/25) | 55 | 119 |
| C6 | GBL/TPM/formic acid (46/32/22) | 43 | 205 |
| C7 | GBL/PM/formic acid (45/45/10) | 34 | >300 |
| C8 | GBL/DPM/formic acid (45/45/10) | 55 | NL* |

TABLE 1-continued

Effect of Coating Remover Compositions on Lift Time Two-Part Epoxy and Two-Part Polyurethane Coating Comparative Examples—Not this invention

| Ex | Coating Remover Composition (wt %) | Lift Time (min) Epoxy | Poly-urethane |
|---|---|---|---|
| C9 | GBL/formic acid (90/10) | 48 | >300 |

NMP = N-methyl-2-pyrrolidone;
GBL = γ-butyrolactone;
PM = "ARCOSOLV PM" propylene glycol monomethyl ether;
DPM = "ARCOSOLV DPM" dipropylene glycol monomethyl ether;
TPM = "ARCOSOLV TPM" tripropylene glycol monomethyl ether;
*NL = no lift after 24 hours.

TABLE 2

Effect of γ-Butyrolactone/Formic acid/Water Compositions on Lift Time Two-Part Epoxy and Two-Part Polyurethane Coating

| | Coating Remover Composition (wt %) | | | Lift Time (min) | |
|---|---|---|---|---|---|
| Ex | GBL* | Water | Formic acid (96%) | Epoxy | Polyurethane |
| 10 | 80 | 10 | 10 | 29 | 70 |
| 11 | 75 | 15 | 10 | 53 | 77 |
| 12 | 67 | 23 | 10 | 69 | 80 |
| 13 | 45 | 45 | 10 | 86 | 153 |
| 14 | 35 | 40 | 25 | 29 | 42 |
| 15 | 46 | 32 | 22 | 31 | 44 |

*GBL = γ-butyrolactone

TABLE 3

Effect of γ-Butyrolactone/Organic acid/Water Compositions on Lift Time Two-Part Epoxy and Two-Part Polyurethane Coating

| Ex | Coating Remover Composition (wt %) | Lift Time (min) Epoxy | Poly-urethane |
|---|---|---|---|
| 16 | GBL/water/formic acid (50/30/20) | 20 | 38 |
| 17 | GBL/water/formic acid/acetic acid (50/30/10/10) | 35 | 71 |
| 18 | GBL/water/formic acid/glycolic acid (50/30/10/10) | 32 | 78 |
| 19 | GBL/water/acetic acid (50/30/20) | 60 | 104 |
| 20 | GBL/water/acetic acid/sodium formate (50/30/15/5) | 131 | 188 |
| 21 | GBL/water/formic acid/sodium formate (50/25/15/10) | 66 | >300 |

TABLE 4

Effect of γ-Butyrolactone/Formic acid/Water Compositions on Lift Time Two-Part Epoxy and Two-Part Polyurethane Coating

| | Example # | | | |
|---|---|---|---|---|
| Component (pbw) | 22 | 23 | 24 | 25 |
| γ-butyrolactone | 55 | 45 | 26 | 40 |
| Water | 20 | 20 | 7.5 | 20 |
| Formic acid (96%) | 20 | 20 | 15 | 15 |
| n-Butanol | 5 | — | 3.5 | 5 |
| t-Butanol | — | — | 18.5 | — |
| "ARCOSOLV PM" glycol ether | — | 15 | — | — |
| Dioctyl phthalate | — | — | 29.5 | — |
| N-methyl-2-pyrrolidone | — | — | — | 20 |
| "Calsoft L-60" surfactant | — | 1.0 | 2.0 | 2.0 |
| Lift time (minutes) | | | | |
| Epoxy | 20 | 37 | 33 | 31 |
| Polyurethane | 33 | 71 | 51 | 99 |

"ARCOSOLV PM" glycol ether, a product of ARCO Chemical Company, is propylene glycol monomethyl ether.
"Calsoft L-60" surfactant is a product of Pilot Chemical Company

I claim:

1. A water-soluble coating remover composition comprising:
   (a) from about 25 to about 94 weight percent of γ-butyrolactone;
   (b) from about 1 to about 40 weight percent of and organic acid; and
   (c) at least about 5 weight percent of water.

2. The composition of claim 1 wherein the organic acid has the formula RCOOH in which R is selected from the group consisting of hydrogen $C_1$–$C_{10}$ alkyl, halogen-substituted $C_1$–$C_{10}$ alkyl, hydroxy-substituted $C_4$–$C_6$ alkyl, and $C_4$–$C_6$ cycloalkyl.

3. The composition of claim 2 wherein an alkali metal salt of said organic acid is used instead of or in addition to said organic acid.

4. The composition of claim 1 wherein the organic acid is selected from the group consisting of formic, acetic, chloroacetic, glycolic, and citric.

5. The composition of claim 1 wherein the organic acid is formic acid.

6. The composition of claim 1 including one or more additives selected from the group consisting of surfactants, thickeners, and rust inhibitors.

7. The composition of claim 1 including a solvent selected from the group consisting of $C_1$–$C_{30}$ aliphatic and aromatic alcohols, glycols, glycol ethers, carbonates, amides, ketones, and esters.

8. The composition of claim 1 wherein the amount of γ-butyrolactone is within the range of about 40 to 94 weight percent, the amount of organic acid is within the range of about 1 to 40 weight percent, and the amount of water is within the range of about 5 to about 55 weight percent.

9. The composition of claim 1 wherein the organic acid is formic acid.

10. A water-soluble coating remover composition comprising:
    (a) an amount of γ-butyrolactone within the range of about 40 to about 94 weight percent;
    (b) an organic acid of the formula RCOOH in which R is selected from the group consisting of hydrogen $C_1$–$C_{10}$ alkyl, halogen-substituted $C_1$–$C_{10}$ alkyl, hydroxy-substituted $C_4$–$C_6$ alkyl, and $C_4$–$C_6$ cycloalkyl, or an alkali metal salt of said organic acid, in an amount within the range of about 1 to about 40 weight percent; and
    (c) an amount of water within the range of about 5 to about 55 weight percent.

11. The composition of claim 10 wherein the organic acid is one or more acids selected from the group consisting of formic, acetic, chloroacetic, glycolic, and citric.

12. The composition of claim 10 wherein the organic acid is formic acid.

13. The composition of claim 10 including one or more additives selected from the group consisting of surfactants, thickeners, and rust inhibitors.

14. The composition of claim 10 including a solvent selected from the group consisting of $C_1$–$C_{30}$ aliphatic and aromatic alcohols, glycols, glycol ethers, carbonates, amides, ketones, and esters.

15. A water-soluble coating remover composition comprising:
    (a) an amount of γ-butyrolactone within the range of about 40 to about 94 weight percent;
    (b) an organic acid selected from the group consisting of formic, acetic, chloroacetic, glycolic, and citric, or an alkali metal salt of said organic acid, in an amount within the range of about 1 to about 40 weight percent; and
    (c) an amount of water within the range of about 5 to about 55 weight percent.

16. The composition of claim 15 wherein the organic acid is formic acid.

17. The composition of claim 15 including one or more additives selected from the group consisting of surfactants, thickeners, and rust inhibitors.

18. The composition of claim 15 including a solvent selected from the group consisting of $C_1$–$C_{30}$ aliphatic and aromatic alcohols, glycols, glycol ethers, carbonates, amides, ketones, and esters.

19. A method of removing a coating from a substrate comprising:
    (a) applying the coating remover composition of claim 1 to a coated substrate;
    (b) allowing the substrate and coating remover to remain in contact until the coating becomes loosened; and
    (c) rinsing the loosened coating from the substrate with water.

20. The method of claim 19 wherein the coating is a crosslinked coating selected from two-part epoxies and two-part polyurethanes.

* * * * *